PULSE WIDTH INDICATOR
Filed July 8, 1964
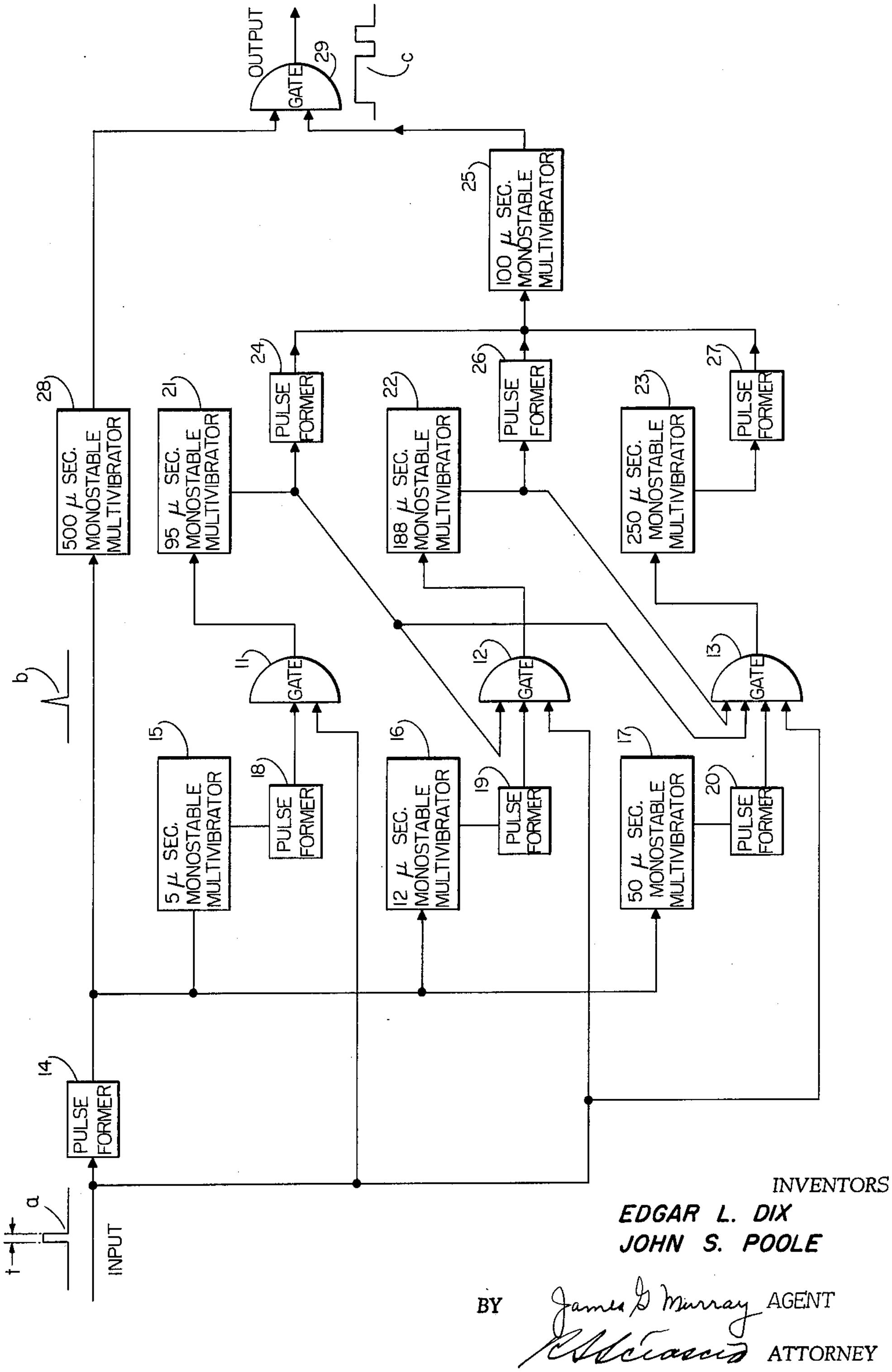
INVENTORS
EDGAR L. DIX
JOHN S. POOLE
BY James G. Murray AGENT
[signature] ATTORNEY 3,230,461
Patented Jan. 18, 1966

3,230,461

PULSE WIDTH INDICATOR

Edgar L. Dix and John S. Poole, Oxon Hill, Md., assignors to the United States of America as represented by the Secretary of the Navy Filed July 8, 1964, Ser. No. 381,270
9 Claims. (Cl. 328—112)
(Granted under Title 35, U.S. Code (1952), sec. 266)

The invention described herein may be manufactured and used by or for the Government of the United States of America for governmental purposes without the payment of any royalties thereon or therefor.

The present invention relates to an electrical circuit which identifies an incoming pulse according to duration category and in particular to such an electrical circuit which provides a notched pulse output wherein the position of the notch or other alteration relative to the output pulse categorizes the duration of an incoming pulse.

As the technology associated with missiles and satellites has developed, there has concurrently developed needs for electronic circuits to perform specialized functions. Because of the unique outer space environmental conditions the prior art does not always satisfy these needs. More explicitly, because of the operational necessities of low power levels, low weight, extremely high reliability, wide climatic variations, etc., the prior art does not always include electronic circuitry capable of functioning as required, particularly in those technological areas wherein a single transmission link between the control station and the spatial vehicle must be utilized to control or interrogate several circuits on the vehicle, such as, for example, in the remote control, or command, systems and in the data transmission, or telemetering, systems.

It is, therefore, an object of this invention to provide a circuit, suitable for use in a missile or satellite electronic system, which will classify an incoming pulse according to a duration category.

Another object is to provide a circuit, functionally operated by highly reliable sub-circuits, which will produce a notched pulse output wherein the position of the notch relative to the output pulse is representative of the duration category of an incoming pulse.

A still further object of the present invention is to provide an electronic circuit, functionally operated by highly reliable sub-circuits, which is suitable for use in a space vehicle, and which will receive an input pulse and provide an output pulse having characteristics which categorize the duration of the input pulse.

Other objects and many of the attendant advantages of this invention will be readily appreciated as the same becomes better understood by reference to the following detailed description of an embodiment of the invention when considered in connection with the accompanying drawing which illustrates the embodiment of the invention in block diagram form.

Referring now to the drawing, the incoming signal pulse *a*, having a duration *t*, is applied directly to gates 11, 12 and 13. Signal pulse *a* is also applied to pulse forming circuit 14 which develops a short duration, or spike, pulse *b*, coincident with the leading edge of signal pulse *a*. Pulse forming circuit 14 is connected to apply pulse *b* to trigger monostable multivibrators 15, 16 and 17 which respectively have periods of 5, 12 and 50 microseconds. The outputs of multivibrators 15, 16 and 17 are respectively connected to pulse forming circuits 18, 19 and 20 which in turn apply spike pulses, coincident with the trailing edges of the 5, 12 and 50 microsecond multivibrator pulses, to the gates 11, 12 and 13 respectively. In the absence of any other input, the gates 11,

12 and 13 respectively pass the spike pulses from pulse forming circuits 18, 19 and 20 to trigger monostable multivibrators 21, 22 and 23 which have periods of 95, 188 and 250 microseconds respectively.

The 95 microsecond duration output pulse of multivibrator 21 is applied to gates 12 and 13 and to pulse forming circuit 24, the latter of which is connected to energize the 100 microsecond period monostable multivibrator 25 by a spike pulse coincident with the trailing edge of the pulse from multivibrator 21. Similarly, the 188 microsecond duration output pulse of multivibrator 22 is applied to gate 13 and to pulse forming circuit 26 which is connected to energize the multivibrator 25 by a spike pulse coincident with the trailing edge of the pulse from multivibrator 22. Multivibrator 25, which may be considered a signal marking device, is also connected to be energized by a spike pulse from pulse forming circuit 27 coincident with the trailing edge of the pulse from multivibrator 23.

Monostable multivibrator 28 is also connected to be energized by the spike pulse *b* from pulse forming circuit 14. The output of multivibrator 28, which is a pulse of 500 microsecond duration, is applied to gate 29, which is also connected to receive the 100 microsecond marking output pulse of multivibrator 25. The output of gate 29, illustrated as wave form *c*, consists of the 500 microsecond output pulse from multivibrator 28 which is, however, passed by gate 29 only in the absence of a marking signal from multivibrator 25.

It is the function of the illustrated embodiment to produce an output signal *c* which will signify into which of four duration categories the incoming pulse *a* is classifiable. More specifically the output signal of the illustrated embodiment signifies whether the duration *t* of pulse *a* is (1) less than 5 microseconds in which event the 100 microsecond notch, or depression, occurs 100 microseconds after the leading edge of pulse *c*; (2) greater than 5 but less than 12 microseconds in which event the notch occurs 200 microseconds after the leading edge of pulse *c*; (3) greater than 12 but less than 50 microseconds in which event the notch occurs 300 microseconds after the leading edge of pulse *c* or (4) greater than 50 microseconds whereupon pulse *c* is not notched.

It will be apparent to skilled persons that the above-described and illustrated embodiment of the invention can obviously be modified to classify the incoming pulses in different and more numerous categories of time.

The operation of the illustrated embodiment of the invention will now be described. Incoming pulse *a* is applied to and closes, or blocks, gates 11, 12 and 13. The leading edge of pulse *a* is operated upon by pulse forming circuit 14 to produce spike pulse *b* which energizes monostable multivibrators 15, 16, 17 and 28. After the 5, 12 and 50 microsecond periods of monostable multivibrators 15, 16 and 17, these multivibrators become deenergized and the trailing edge of the multivibrator signals are respectively operated on by pulse forming circuits 18, 19 and 20 to form spike pulses which are applied to gates 11, 12 and 13.

If the duration *t* of incoming pulse *a* is greater than 5 microseconds, the spike pulse from circuit 18 will be blocked at gate 11. If, however, the duration *t* of pulse *a* is less than 5 microseconds, gate 11 is unblocked, or open, and passes the spike pulse from pulse forming circuit 18. This spike pulse energizes monostable multivibrator 21 for a period of 95 microseconds. The output of multivibrator 21 is applied to gates 12 and 13 and blocks the subsequent spike pulses from circuits 19 and 20. Pulse forming circuit 24 operates on the trailing edge of the multivibrator 21 output to form a spike pulse which energizes monostable multivibrator 25. The 100 microsecond signal from multivibrator 25, which was started 100 microseconds after pulse *b* energized the 500 microsecond period monostable multivibrator 28, blocks gate 29 and causes the output signal to be notched, or depressed, during the second 100 microsecond increment of output pulse *c*.

In a similar manner, a pulse *a* having a duration *t* between 5 and 12 microseconds will energize multivibrators 22 and 25 to cause output pulse *c* to be notched during the third 100 microsecond increment. Likewise, if pulse *a* has duration *t* between 12 and 50 microseconds, multivibrators 23 and 25 will be energized to notch the output pulse *c*, as illustrated, during the fourth 100 microsecond increment. If the duration *t* is over 50 microseconds, the gates 11, 12 and 13 will block the spike pulses from circuits 18, 19 and 20, the multivibrator 25 will not be energized and the output signal *c* will not be pulsed.

It will, of course, be apparent that the components 24–29, as well as the obviously required device which displays, records or otherwise responds to wave form *c*, can be considered as being a specialized form of equipment for utilizing the sorting, or duration categorizing, process which occurs in the prior components 11–20. Much less specialized equipment could obviously be used. For example, the output of gates 11, 12 and 13 could be used to energize lamp indicators. In this form of the invention, the duration category of pulse *a* would be related to the lamps energized. A different relationship would occur if the blocking feature associated with multivibrators 21 and 22 is included. In this form of the invention the particular lamp energized would signify the duration category of pulse *a*.

The disclosed embodiment of the invention will be recognized as having general utility and being built up of sub-circuits which are extremely well known. The components used in the sub-circuits will, of course, reflect the environment in which the invention is to be used. For example, if used in telephonic or audio intercom switching circuits, power level, reliability and maintenance considerations may favor conventional vacuum tubes and impedances whereas, if used in missile and satellite electronic systems, the sub-circuits of the invention could most advantageously be transistorized. In yet other environments the use of film or other miniatured sub-circuits may be desirable. However, it is emphasized, the sub-circuits of the invention, that is, the monostable multivibrators, the gates and the pulse forming circuits, are all well known and developed to the point of extreme reliability in each of the tube, transistor or miniaturized forms.

There has been disclosed, and described, a specific embodiment of the invention which in its broad aspects contemplates the providing of a circuit, functionally operated by highly reliable sub-circuits, which produces a notched pulse output signal wherein the position of the notch relative to the output pulse is representative of the duration category of an input pulse.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A circuit for classifying an input pulse by duration into one of several categories comprising:

a plurality of monostable multivibrators, each connected to be energized by said input pulse and individually having a period equal to the upper limit of one of said several categories;

a pulse former operatively associated with each of said plurality of monostable multivibrators and energized at the end of said associated multivibrator period to produce a spike pulse;

a gate connected to each pulse former to receive said spike pulse and also connected to receive said input pulse, said gate functioning to pass said spike pulse in the absence of said input pulse;

whereby the number of gates passing said spike pulses is indicative of the duration category of said input pulse.

2. A circuit for classifying an input pulse by duration into one of several categories comprising:

a plurality of monostable multivibrators, each connected to be energized by said input pulse and individually having a period equal to the upper limit of one of said several categories;

a pulse former operatively associated with each of said plurality of monostable multivibrators and energized at the end of said associated multivibrator period to produce a spike pulse;

a gate connected to each pulse former to receive said spike pulse and also connected to receive said input pulse, said gate functioning to pass said spike pulse in the absence of said input pulse;

blocking means connected to said gates and energized by the first passed spike pulse to prevent the passing of any subsequent spike pulses by said gates;

whereby the gate which passed said first received spike pulse is indicative of the duration category of said input pulse.

3. A circuit for classifying the duration of an incoming electrical pulse as being in one of $n$ categories comprising:

prolonged pulse producing means connected to receive said incoming pulse and to produce a prolonged pulse starting substantially at the same time as said incoming pulse and persisting for $n+1$ increments of time, where $n$ is an integer greater than one;

$n-1$ short pulse producing means connected to receive said incoming pulse, each of said $n-1$ short pulse producing means being energized only if the duration of said incoming pulse is within the limits of a certain one of the duration categories other than the longest and each of said $n-1$ short pulse producing means being operative to produce a short pulse at a predetermined time subsequent to the start of said incoming pulse;

marking pulse producing means connected to be energized by said $n-1$ short pulse producing means and to produce a marking pulse persisting for one increment of time and correlated in time to said prolonged pulse according to which one of said $n-1$ short pulse producing means is energized by said incoming pulse and gate means connected to receive and combine said prolonged pulse and said marking pulse.

4. The circuit set forth in claim 3 wherein each of said $n-1$ short pulse producing means includes:

a monostable multivibrator connected to be energized by the start of said incoming pulse and producing an output persisting for a period substantially equal to the upper limit of different ones of the $n-1$ shortest duration categories;

a pulse forming sub-circuit connected to said multivibrator and energized by the conclusion of said multivibrator output and a gate connected to said pulse forming sub-circuit and to receive said input pulse and to pass the output of said pulse forming sub-circuit only in the absence of said input pulse.

5. The circuit set forth in claim 4 and further including means to prevent said gate from passing the output of said pulse forming sub-circuit if a gate in any of the other $n-1$ short pulse producing means had previously passed an output from a pulse forming sub-circuit.

6. The circuit set forth in claim 3 wherein said prolonged pulse producing means and said short pulse producing means comprise monostable multivibrator means.

7. A circuit for processing an input signal comprising: first, second and third monostable multivibrators coupled to receive said input pulse;

first, second and third gates, said first gate having a first and second input and an output, said second gate having first, second and third inputs and an output, and said third gate having first, second, third and fourth inputs and an output, each of said gates having said first input coupled to a respective one of said monostable multivibrators and said second input coupled directly to receive said input signal;

pulse-forming means having an input and an output;

fifth, sixth and seventh monostable multivibrators each coupled to receive the output of a respective one of said first, second or third gates, and each of said fifth, sixth and seventh monostable multivibrators coupled to the input of said pulse-forming means, and the output of said fifth monostable multivibrator coupled to the third input of said second and third gates, and the output of said sixth monostable multivibrator coupled to the fourth input of said third gate;

eighth monostable multivibrator means coupled to the output of said pulse-forming means;

output gate means having first and second inputs and an output with said first input coupled to said eighth monostable multivibrator means; and ninth monostable multivibrator means coupled to receive said input signal and having an output coupled to said second input of said output gate.

8. The circuit set forth in claim 7 wherein the period of said second monostable multivibrator is greater than the period of said first multivibrator and the period of said third monostable multivibrator is greater than the period of said second monostable multivibrator.

9. The circuit set forth in claim 8 wherein the period of said sixth monostable multivibrator is greater than the period of said fifth monostable multivibrator and wherein the period of said seventh monostable multivibrator is greater than the period of said sixth monostable multivibrator.

References Cited by the Examiner

UNITED STATES PATENTS

| | | | |
|---|---|---|---|
| 2,951,988 | 9/1960 | Harlan et al. | 328—112 |
| 3,122,647 | 2/1964 | Huey | 328—112 X |

JOHN W. HUCKERT, *Primary Examiner.*

S. D. MILLER, *Assistant Examiner.*